(12) United States Patent
Lin et al.

(10) Patent No.: US 12,741,347 B1
(45) Date of Patent: Sep. 22, 2026

(54) POSITIONING DEVICE FOR ASSEMBLING POWER TOOL HOLDER HOUSING AND USE METHOD THEREOF

(71) Applicant: Luoyang Xincheng Precision Machinery Co., Ltd., Luoyang (CN)

(72) Inventors: Wei Lin, Luoyang (CN); Xiangqian Liu, Luoyang (CN); Wenjue Zhao, Luoyang (CN); Junjie Chang, Luoyang (CN); Xiangyang Ding, Luoyang (CN)

(73) Assignee: Luoyang Xincheng Precision Machinery Co., Ltd., Luoyang (CN)

( * ) Notice: Subject to any disclaimer, the term of this patent is extended or adjusted under 35 U.S.C. 154(b) by 0 days.

(21) Appl. No.: 19/456,768

(22) Filed: Jan. 22, 2026

(30) Foreign Application Priority Data

May 13, 2025 (CN) ........................ 202510608591.9

(51) Int. Cl.
*B23Q 3/06* (2006.01)

(52) U.S. Cl.
CPC ..................................... *B23Q 3/06* (2013.01)

(58) Field of Classification Search
CPC ........................... B23Q 3/06; Y10T 29/49998
See application file for complete search history.

(56) References Cited

FOREIGN PATENT DOCUMENTS

| | | | | |
|---|---|---|---|---|
| CN | 106984982 A | * | 7/2017 | ............... B23Q 3/10 |
| CN | 222449398 U | | 2/2025 | |

OTHER PUBLICATIONS

Lin CN106984982 Englsih (Year: 2017).*
First Office Action for CN application # 202510608591.9, dated Jun. 25, 2025. China National Intellectual Property Administration, Beijing, China.
Notification to Grant Patent Right for Invention for CN app. 202510608591.9, dated Aug. 1, 2025. China National Intellectual Property Administration, Beijing, China.

* cited by examiner

*Primary Examiner* — Jason L Vaughan
*Assistant Examiner* — Amanda Kreiling
(74) *Attorney, Agent, or Firm* — M&B IP Analysts, LLC

(57) ABSTRACT

A positioning device for assembling a power tool holder housing and a use method of the positioning device, includes the power tool holder housing, a positioning table and elastic key blocks A; a lower cross keyway is formed in the bottom surface of the power tool holder housing, an upper cross keyway is formed in the upper surface of the positioning table; the lower cross keyway and the upper cross keyway are disposed in up-down correspondence; the elastic key blocks A are respectively mounted in corresponding keyways in four directions; an elongated circular notch is formed in the upper portion of a side surface of the elastic key block body A in the length direction of the elastic key block body, a cylindrical pin is disposed in the elongated circular notch, an opening of the elongated circular notch is located in the lower cross keyway.

2 Claims, 10 Drawing Sheets

Enlarged part A

POSITIONING DEVICE FOR ASSEMBLING POWER TOOL HOLDER HOUSING AND USE METHOD THEREOF

CROSS-REFERENCE TO RELATED APPLICATION

This patent application claims the benefit and priority of Chinese Patent Application No. 202510608591.9 filed with the China National Intellectual Property Administration on May 13, 2025, the disclosure of which is incorporated by reference herein in its entirety as part of the present application.

TECHNICAL FIELD

The present disclosure relates to the technical field of key blocks, and in particular to a positioning device for assembling a power tool holder housing and a use method of the positioning device for assembling the power tool holder housing.

BACKGROUND

As is well known, when a housing of a power tool holder currently used by a CNC turning and milling composite machine tool is subjected to hole boring by a special double-spindle boring machine, a positioning method adopted during machining is mainly realized by keyway fit or limiting. The accuracy of this positioning method is ensured mainly by relying on tolerance fit, inevitably causing the problem of clearance fit, and such clearances may result in an inability to achieve completely clearance-free fit between key blocks and keyway bodies, thus affecting positioning accuracy and repetition accuracy; moreover, by relying on the tolerance fit, the requirement for the width of keyways is higher, causing an increase in rejection rate during machining, and a higher technological level and higher production costs are needed to guarantee the machining accuracy; if multiple positioning devices are added, a machining operation is complicated, a time required for positioning is prolonged, and the production efficiency is lower; these problems similarly occur during the use and mounting of the power tool holder, and the key blocks in bottom elongated keyways rely on tolerance fit for mounting on a tool turret. Such a way also leads to poor repeated positioning accuracy and has a negative impact on the mounting accuracy and the use performance of the power tool holder.

SUMMARY

In order to overcome the shortcomings of the prior art, the present disclosure provides a positioning device for assembling a power tool holder housing, and a use method of the positioning device.

To achieve the object, the present disclosure adopts the following technical solutions:

A positioning device for assembling a power tool holder housing includes the power tool holder housing, a positioning table and elastic key blocks A; a lower cross keyway is formed in a bottom surface of the power tool holder housing, an upper cross keyway is formed in an upper surface of the positioning table; the lower cross keyway and the upper cross keyway are disposed in up-down correspondence; and the elastic key blocks A are respectively mounted in corresponding keyways of the upper cross keyway in four directions; each of the elastic key blocks A includes an elastic key block body A, a cylindrical pin and elastic screws; an elongated circular notch is formed in an upper portion of a side surface of the elastic key block body A in a length direction of the elastic key block body A, and the elongated circular notch has a longitudinal section in a “C” shape; the cylindrical pin is disposed in the elongated circular notch, an opening of the elongated circular notch is located in the lower cross keyway, two screw holes are spaced apart on a surface opposite to the side surface in which the elongated circular notch is formed, elastic screws respectively penetrate into the screw holes, and the screw holes are disposed in communication with the elongated circular notch.

According to the positioning device for assembling the power tool holder housing, a tapped hole A is formed in a side, close to the screw holes, of an upper surface of the elastic key block body A; four bolt mounting holes disposed in up-down correspondence are respectively formed in a bottom of the upper cross keyway, the bolt mounting holes are eccentric holes; the tapped holes A in elastic key block bodies A are corresponding to the bolt mounting holes in the bottom of the upper cross keyway, and are fixedly connected to the bolt mounting holes in the bottom of the upper cross keyway by means of bolts.

A use method of the positioning device for assembling the power tool holder housing is provided, the positioning device includes the power tool holder housing, the positioning table and the elastic key blocks A, and the use method includes specific operation steps as follow:

first, fixing the positioning table to a machining table top by means of long bolts in table mounting holes at four corners of the positioning table;

second, screwing the elastic screws into the two screw holes, and abutting the elastic screws against the cylindrical pin in the elongated circular notch to allow a camber surface of the cylindrical pin to protrude out of the opening of the elongated circular notch by 0.08 mm-0.1 mm;

third, placing four sets of elastic key block bodies A mounted with the cylindrical pins into the upper cross keyway in the upper surface of the positioning table, respectively placing the four sets of elastic key block bodies A in the four directions of the upper cross keyway, and passing the bolts through the tapped holes A in the elastic key block bodies A and fixedly connecting the bolts to the bolt mounting holes in the bottom of the upper cross keyway;

fourth, pressing the power tool holder housing on the upper portions of the four sets of elastic key block bodies A, to allow camber surface portions of the cylindrical pins protruding out of the openings to come into contact with the corresponding sides of the lower cross keyway, the lower cross keyway compressing the protruding camber surface portions back into the elastic key block bodies A by 0.089 mm-0.01 mm with a keyway tolerance of 0.011 mm-0 mm, thereby achieving clearance-free fit; and fifth, finally tightening compression screws at four corners of an upper surface of the power tool holder housing in four compression screw holes of the upper surface of the positioning table.

A positioning device for assembling a power tool holder housing includes the power tool holder housing, a positioning table and elastic key blocks B. A lower cross keyway is formed in a bottom surface of the power tool holder housing, an upper cross keyway is formed in an upper surface of the positioning table; the lower cross keyway and the upper cross keyway are disposed in up-down correspondence; and the elastic key blocks B are respectively mounted in corresponding keyways of the upper cross keyway in four directions; each of the elastic key blocks B includes an elastic key block body B, a contact plate and an elastic plate; the elastic key block body B is configured in a square shape and formed with a notch with an inverted "L" shape is formed on one side surface of the elastic key block body B; and the elastic plate and the contact plate are disposed sequentially in the notch from inside to outside; an outer side surface of the contact plate protrudes out of an outer side surface of the elastic key block body B by 0.02 mm, an upper portion of the outer side surface of the contact plate is configured as a bevel; and the outer side surface of the elastic key block body B and the outer side surface of the contact plate are disposed in beveled transition.

According to the positioning device for assembling the power tool holder housing, a tapped hole B is formed in a side, close to the screw holes, of an upper surface of the elastic key block body B; four bolt mounting holes disposed in up-down correspondence are respectively formed in an bottom of the upper cross keyway, the bolt mounting holes are eccentric holes; the tapped holes B in the elastic key block bodies B are corresponding to the bolt mounting holes in the bottom of the upper cross keyway, and fixedly connected to the bolt mounting holes in the bottom of the upper cross keyway by means of bolts.

A use method of the positioning device for assembling the power tool holder housing is provided, the positioning device includes the power tool holder housing, the positioning table and the elastic key blocks B, and the use method includes specific operation steps as follow:

- first, fixing the positioning table to a machining table top by means of long bolts in table mounting holes at four corners of the positioning table;
- second, sequentially placing the elastic plate and the contact plate into the notch of the elastic key block body B; and the outer side surface of the elastic key block body B and the outer side surface of the contact plate being in beveled transition;
- third, placing four sets of mounted elastic key blocks B into the upper cross keyway in the upper surface of the positioning table, respectively placing the four sets of mounted elastic key blocks B in the four directions of the upper cross keyway; and passing the bolts through the tapped holes B of the elastic key block bodies B and fixedly connecting the bolts to the bolt mounting holes in the bottom of the upper cross keyway;
- fourth, pressing the power tool holder housing on upper portions of the four sets of elastic key block bodies B, to allow the corresponding sides of the lower cross keyway to compress the outer side surfaces of the contact plates, elastically deforming the elastic plates, compressing the contact plates protruding out of the outer side surfaces of the elastic key block bodies B back into the lower cross keyway by a compressive amount of 0.009 mm-0.02 mm, allowing two sides of each of the elastic key block bodies B to be completely attached to the lower cross keyway, and thereby achieving clearance-free fit; and
- fifth, tightening compression screws at four corners of an upper surface of the power tool holder housing in four compression screw holes of the upper surface of the positioning table.

A positioning device for assembling a power tool holder housing includes the power tool holder housing, a positioning table and elastic key blocks C. A lower cross keyway is formed in a bottom surface of the power tool holder housing, an upper cross keyway is formed in an upper surface of the positioning table; the lower cross keyway and the upper cross keyway are disposed in up-down correspondence; and the elastic key blocks C are respectively mounted in corresponding keyways of the upper cross keyway in four directions; each of the elastic key blocks C includes an elastic key block body C and a press block; the elastic key block body C is configured in a form of an "L" shaped step, the press block is disposed on a stepped surface of the elastic key block body C; and the press block and the elastic key block body C form a square structure; an elongated semicircular slot A is formed in a length direction of the stepped inner side surface of the elastic key block body C, a clearance is formed between the press block and the stepped inner side surface of the elastic key block body C above the elongated semicircular slot A; and the stepped inner side surface of the elastic key block body C below the elongated semicircular slot A is disposed to attach to the press block.

According to the positioning device for assembling the power tool holder housing, a tapped hole C is formed in an upper surface of the press block, four bolt mounting holes disposed in up-down correspondence are respectively formed in the bottom of the upper cross keyway, the bolt mounting holes are eccentric holes; the tapped holes C in the press blocks are corresponding to the bolt mounting holes in the stepped surfaces of the elastic key block bodies C and the bolt mounting holes in the bottom of the upper cross keyway, and are fixedly connected to the bolt mounting holes in the stepped surfaces of the elastic key block bodies C and the bolt mounting holes in the bottom of the upper cross keyway by means of bolts.

A use method of the positioning device for assembling the power tool holder housing is provided, the positioning device includes the power tool holder housing, the positioning table and the elastic key blocks C, and the use method includes specific operation steps as follow:

- first, fixing the positioning table to a machining table top by means of long bolts in table mounting holes at four corners of the positioning table;
- second, placing the press blocks on the stepped surfaces of the elastic key block bodies C, placing four sets of mounted elastic key blocks C into the upper cross keyway in the upper surface of the positioning table, respectively placing the four sets of mounted elastic key blocks in the four directions of the upper cross keyway; and passing the bolts through the tapped holes C of the press blocks, the bolt mounting holes in the stepped surfaces of the elastic key block bodies C and fixedly connecting the bolts to the bolt mounting holes in the bottom of the upper cross keyway, to allow a lower portion surfaces of the stepped inner side surfaces of the elastic key block bodies C to be attached to the press blocks;
- third, pressing the power tool holder housing on upper portions of four sets of elastic key blocks C, to allow corresponding side walls of the lower cross keyway to compress the elastic key block bodies C, deforming the elastic key block bodies C toward inner side surfaces of the press blocks, to allow two side surfaces of each of the elastic key blocks C to be completely attached to two corresponding side inner walls of the lower cross keyway, and thereby achieving clearance-free fit; and fourth, tightening compression screws at four corners of an upper surface of the power tool holder housing in four compression screw holes of the upper surface of the positioning table.

A positioning device for assembling a power tool holder housing includes the power tool holder housing, a positioning table and elastic key blocks D. A lower cross keyway is formed in a bottom surface of the power tool holder housing, an upper cross keyway is formed in an upper surface of the positioning table; the lower cross keyway and the upper cross keyway are disposed in up-down correspondence; and the elastic key blocks D are respectively mounted in corresponding keyways of the upper cross keyway in four directions; each of the elastic key blocks D includes an elastic key block body D and a trapezoidal key block; the trapezoidal key block is configured in a shape of a right-angle trapezoid having a larger upper side and a smaller lower side; and a middle of a bevel of the trapezoid key block is provided with an elongated boss in a length direction of the middle of the bevel of the trapezoid key block; the trapezoid key block body D is configured in a shape of a right-angle trapezoid having a smaller upper side and a larger lower side; a bevel of a lower portion of the boss is in contact with a bevel of the elastic key block body D, a clearance is formed between the bevel of an upper portion of the boss and the bevel of the elastic key block body D; and an elongated semicircular slot B is formed in a middle of the elastic key block body D corresponding to the boss.

According to the positioning device for assembling the power tool holder housing, a tapped hole D is formed in an upper surface of the trapezoidal key block; four bolt mounting holes disposed in up-down correspondence with the tapped holes D are formed in a bottom of the upper cross keyway, the bolt mounting holes are eccentric holes; the tapped holes D in the trapezoidal key blocks are corresponding to the bolt mounting holes in the bottom of the upper cross keyway, and the tapped holes D in the trapezoidal key blocks are fixedly connected to the bolt mounting holes in the bottom of the upper cross keyway by means of bolts.

A use method of the positioning device for assembling the power tool holder housing is provided, the positioning device includes the power tool holder housing, the positioning table and the elastic key blocks D, and the use method includes specific operation steps as follow:

first, fixing the positioning table to a machining table top by means of long bolts in table mounting holes at four corners of the positioning table;

second, corresponding the bevels of four sets of elastic key block bodies D to the bevels of the trapezoidal key blocks, placing the four sets of elastic key block bodies D into the upper cross keyway in the upper surface of the positioning table, respectively placing the four sets of elastic key block bodies D in the four directions of the upper cross keyway; and in this case, bottom surfaces of the trapezoidal key blocks being higher than bottom surfaces of the elastic key block bodies D, the bottom surfaces of the elastic key block bodies D being located at the bottom of the upper cross keyway; the bottom surfaces of the trapezoidal key blocks being not in contact with the bottom of the upper cross keyway, and top surfaces of the trapezoidal key blocks protruding out of the top surfaces of the elastic key block bodies D;

third, pressing down the bolts in the tapped holes D to pass through the tapped holes D of the elastic trapezoidal key blocks, tightening the bolts in the bolt mounting holes of the upper cross keyway; compressing the trapezoidal key blocks and the elastic key block bodies D downward, and descending the trapezoidal key blocks during downward compression; tightly expanding lower portions of the elastic key block bodies D and the trapezoidal key blocks in the upper cross keyway, pressing the lower cross keyway of the power tool holder housing on upper portions of the elastic key block bodies D and the trapezoidal key blocks; corresponding side walls of the lower cross keyway compressing the elastic key block bodies D, deforming the elastic key block bodies D toward clearances between the bevels of the upper portions of the bosses and the bevels of the elastic key block bodies D, to allow two side surfaces of each of the elastic key block D to be completely attached to two corresponding side inner walls of the lower cross keyway, and thereby achieving clearance-free fit; and fourth, tightening compression screws at four corners of an upper surface of the power tool holder housing in four compression screw holes of the upper surface of the positioning table.

By adopting the above technical solutions, the present disclosure has the following beneficial effects. According to the positioning device for assembling the power tool holder housing and the use method of the positioning device described in the present disclosure, by providing the elastic key blocks, the elastic key block bodies of the elastic key blocks have the deformation capability, the lower cross keyway in the bottom surface of the positioning table is pressed on the upper portions of the elastic key blocks, and the elastic key block bodies deform to allow the interference fit between the elastic key block bodies and the surfaces fitting therewith, so that the positioning accuracy is higher, and mounting and disassembly are more convenient; the present disclosure is simple and compact in structure and has not high accuracy requirement for the width of the keyways, the yield of machining is improved, and the production costs are greatly reduced compared to the prior art.

Figure 1:
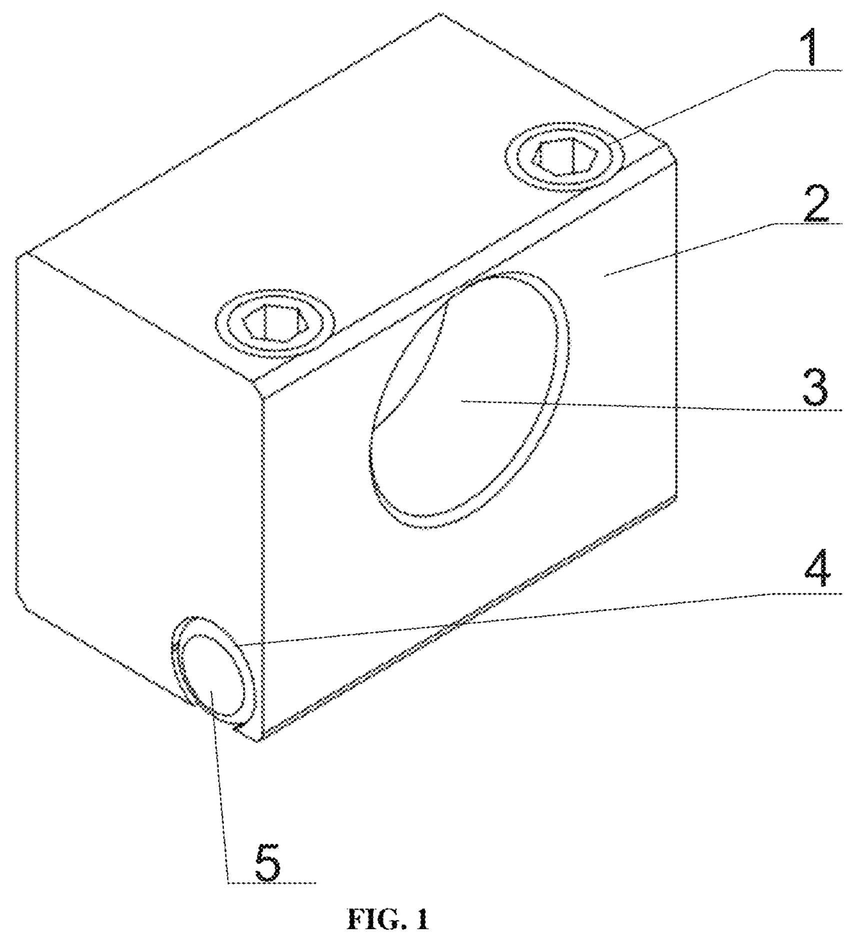
FIG. 1 shows a schematic structural diagram of an elastic key block A according to an embodiment of the present disclosure.

Reference numerals in the figures: 1. Elastic screw; 2. Elastic key block body A; 3. Tapped hole A; 4. Elongated circular notch; 5. Cylindrical pin; 6. Opening; 7. power tool holder housing; 8. Lower cross keyway; 9. Upper cross keyway; 10. Elastic key block A; 11. Positioning table; 12. Tapped hole B; 13. Elastic key block body B; 14. Contact plate; 15. Elastic plate; 16. Elastic key block B; 17. Tapped hole C; 18. Press block; 19. Elastic key block body C; 20. Elongated semicircular slot A; 21. Elastic key block C; 22. Trapezoidal key block; 23. Elastic key block D; 24. Elastic key block body D; 25. Elongated semicircular slot B; 26. Boss; 27. Tapped hole D; 28. Compression screw; 29. Compression screw hole; 30. Table mounting hole; 31. Pin hole.

DETAILED DESCRIPTION OF THE EMBODIMENTS

The present disclosure will be explained in detail in conjunction with the following embodiments, and an object of the present disclosure is to protect all technical improvements within the scope of the present disclosure.

Figure 2:
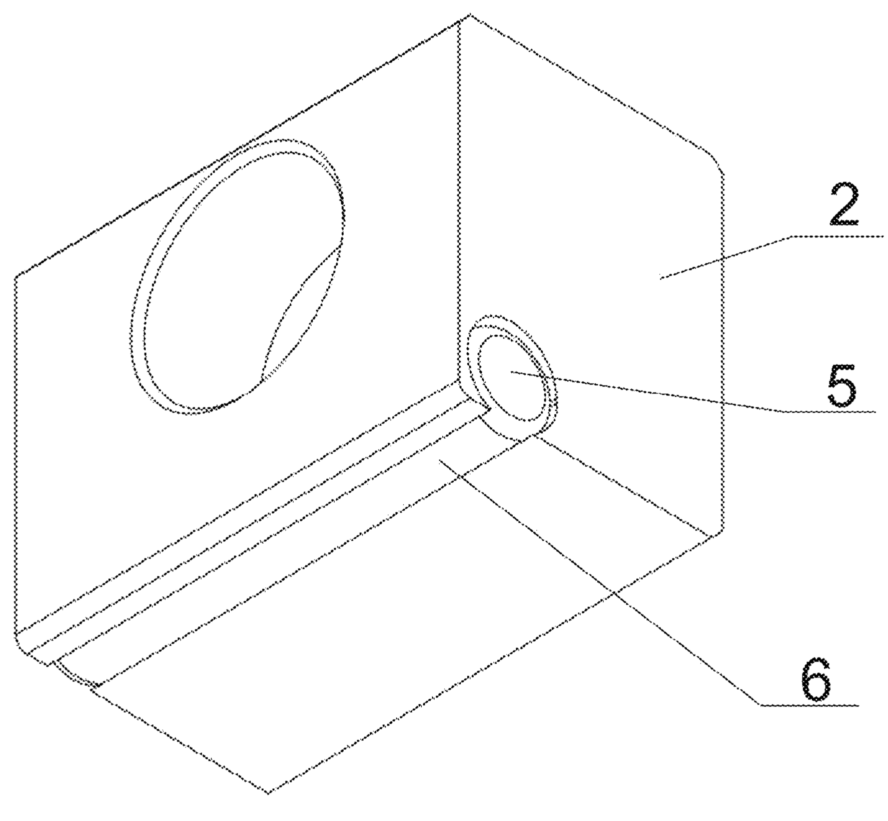
FIG. 2 shows a schematic structural diagram of a cylindrical pin in the elastic key block A according to an embodiment of the present disclosure.
Figure 3:
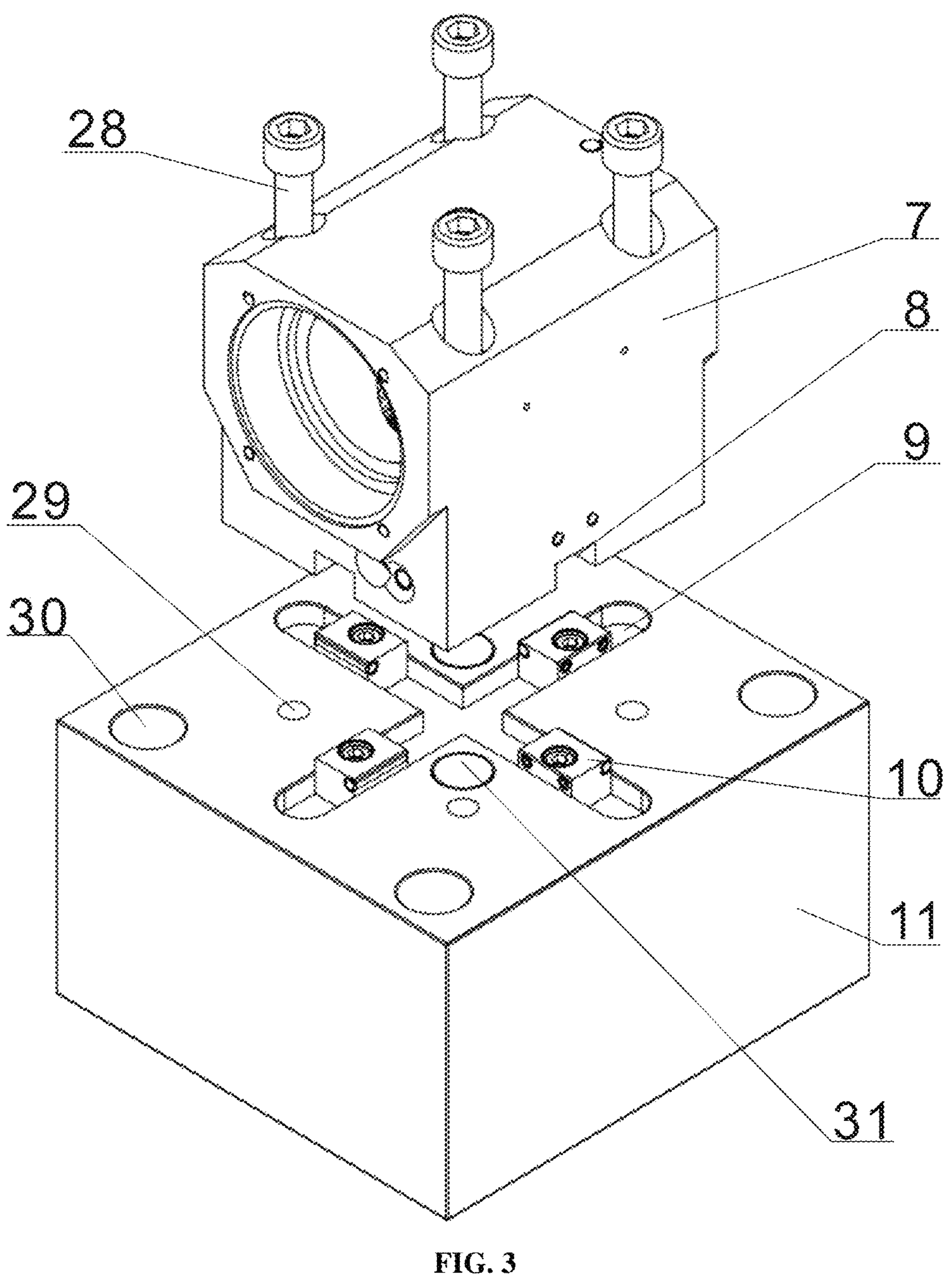
FIG. 3 shows a schematic assembly diagram of a first solution according to an embodiment of the present disclosure.

A positioning device for assembling a power tool holder housing described with reference to FIGS. 1-3 includes the power tool holder housing 7, a positioning table 11 and elastic key blocks A 10. A lower cross keyway 8 is formed in the bottom surface of the power tool holder housing 7, and an upper cross keyway 9 is formed in the upper surface of the positioning table 11. The lower cross keyway 8 and the upper cross keyway 9 are disposed in up-down correspondence, and the elastic key blocks A 10 are respectively mounted within corresponding keyways in four directions. Each of the elastic key blocks A 10 includes an elastic key block body A 2, a cylindrical pin 5 and elastic screws 1. An elongated circular notch 4 is formed in the upper portion of a side surface of the elastic key block body A 2 in the length direction of the elastic key block body A 2, and the elongated circular notch 4 has a longitudinal section in a "C" shape; the cylindrical pin 5 is disposed in the elongated circular notch 4, an opening 6 of the elongated circular notch 4 is located in the lower cross keyway 8, two screw holes are formed in a spaced manner on a surface opposite to the formed elongated circular notch 4, elastic screws 1 respectively penetrate into the screw holes, and the screw holes are disposed in communication with the elongated circular notch 4.

In an embodiment, a tapped hole A 3 is formed in the side, close to the screw holes, of the upper surface of each elastic key block body A 2, four bolt mounting holes disposed in up-down correspondence are respectively formed in the bottom of the upper cross keyway 9, and the bolt mounting holes are eccentric holes. The screw holes A 3 in the elastic key block bodies A 2 are corresponding to the bolt mounting holes in the bottom of the upper cross keyway 9; and the screw holes A 3 in the elastic key block bodies A are fixedly connected to the bolt mounting holes in the bottom of the upper cross keyway 9 by means of bolts.

The use method of the positioning device including the power tool holder housing 7, the positioning table 11 and the elastic key blocks A 10 is described with reference to FIGS. 1-3. The use method of the positioning device includes specific operation steps as follow:

- first, the positioning table 11 is fixed to a machining table top by means of long bolts in table mounting holes 30 at four corners of the positioning table 11;
- second, the elastic screws 1 are screwed into the two screw holes, and the elastic screws 1 are abutted against the cylindrical pin 5 in the elongated circular notch 4, so that the camber surface of the cylindrical pin 5 protrudes out of the opening 6 by 0.08 mm-0.1 mm;
- third, four sets of elastic key block bodies A 2 mounted with the cylindrical pins 5 are placed into the upper cross keyway 9 in the upper surface of the positioning table 11, the four sets of elastic key block bodies A 2 are respectively placed in the four directions of the upper cross keyway 9, and the bolts pass through the tapped holes A 3 in the elastic key block bodies A 2 and are fixedly connected to the bolt mounting holes in the bottom of the upper cross keyway 9;
- fourth, the power tool holder housing 7 is pressed on the upper portions of the four sets of elastic key block bodies A 2, to allow the camber surfaces of the cylindrical pins 5 protruding out of the openings 6 to come into contact with the corresponding sides of the lower cross keyway 8, the lower cross keyway 8 compresses the protruding camber surfaces back into the elastic key block bodies A 2 by 0.089 mm-0.01 mm with a keyway tolerance of 0.011 mm-0 mm, and thus achieving a clearance-free fit; and
- fifth, compression screws 28 at the four corners of the upper surface of the power tool holder housing 7 are tightened in four compression screw holes 29 in the upper surface of the positioning table 11, to play compression and securing roles during machining.

Figure 4:
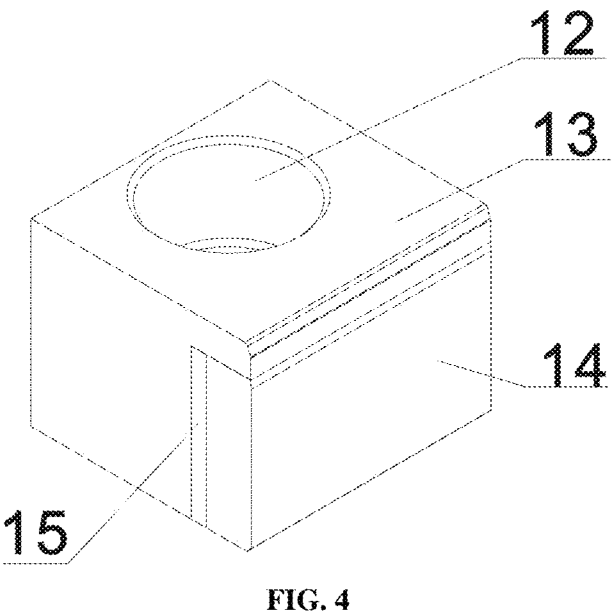
FIG. 4 shows a schematic structural diagram of an elastic key block B according to an embodiment of the present disclosure.
Figure 5:
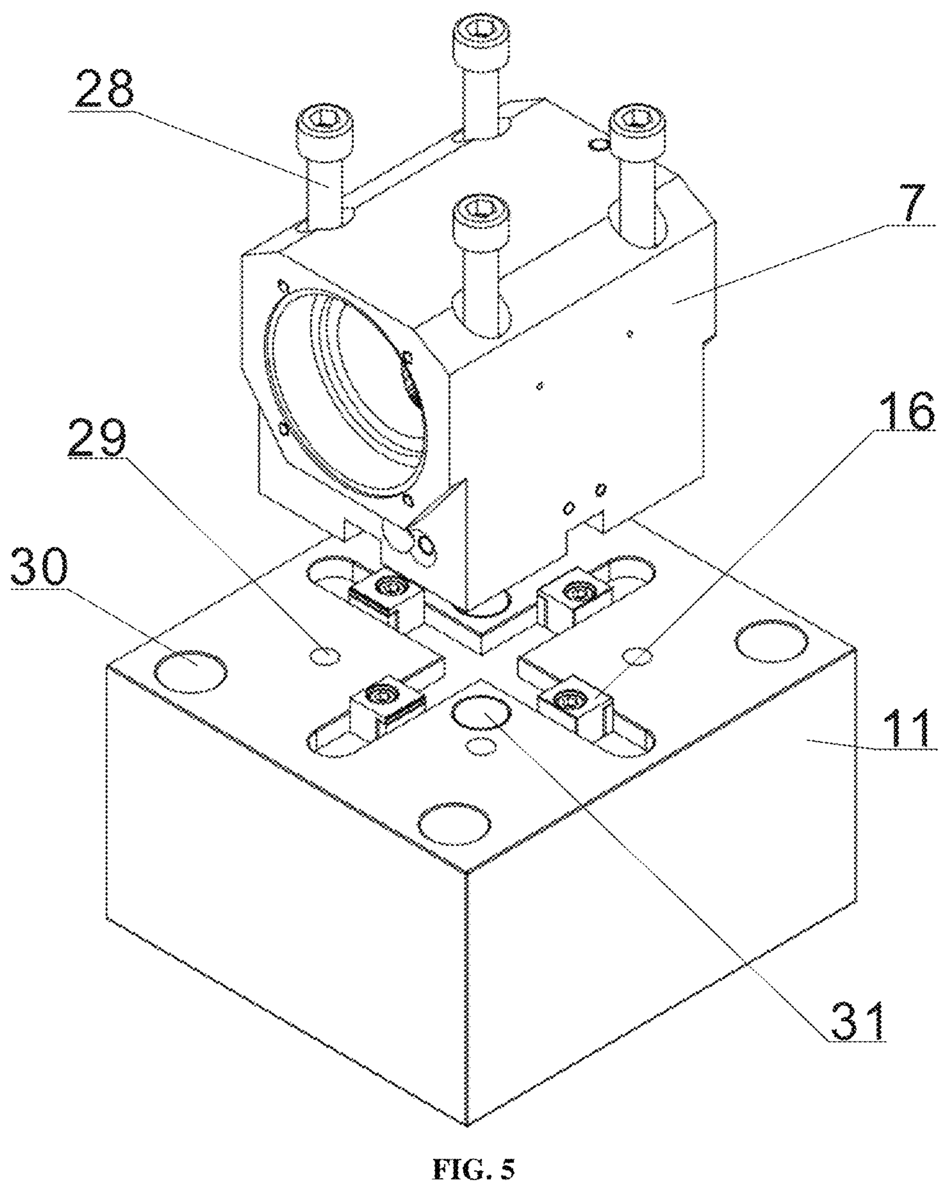
FIG. 5 shows a schematic assembly diagram of a second solution according to an embodiment of the present disclosure.
Figure 6:
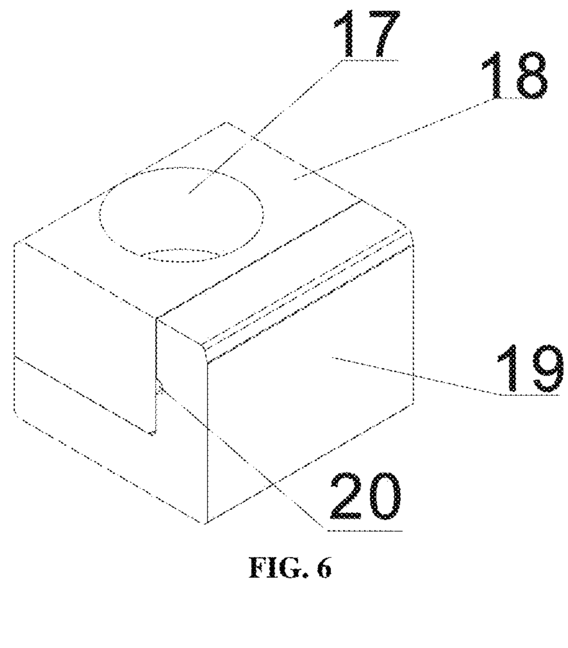
FIG. 6 shows a schematic structural diagram of an elastic key block C according to an embodiment of the present disclosure.
Figure 7:
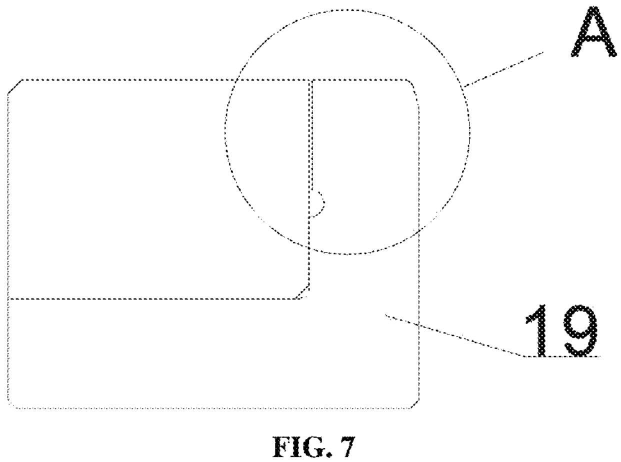
FIG. 7 shows a front view of the elastic key block C according to an embodiment of the present disclosure.
Figure 8:
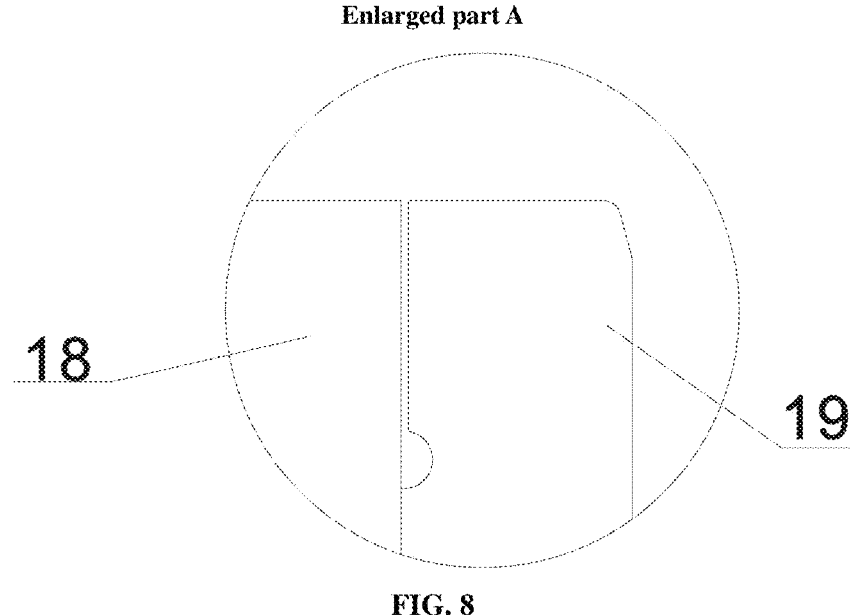
FIG. 8 shows an enlarged view of part A in FIG. 7.
Figure 9:
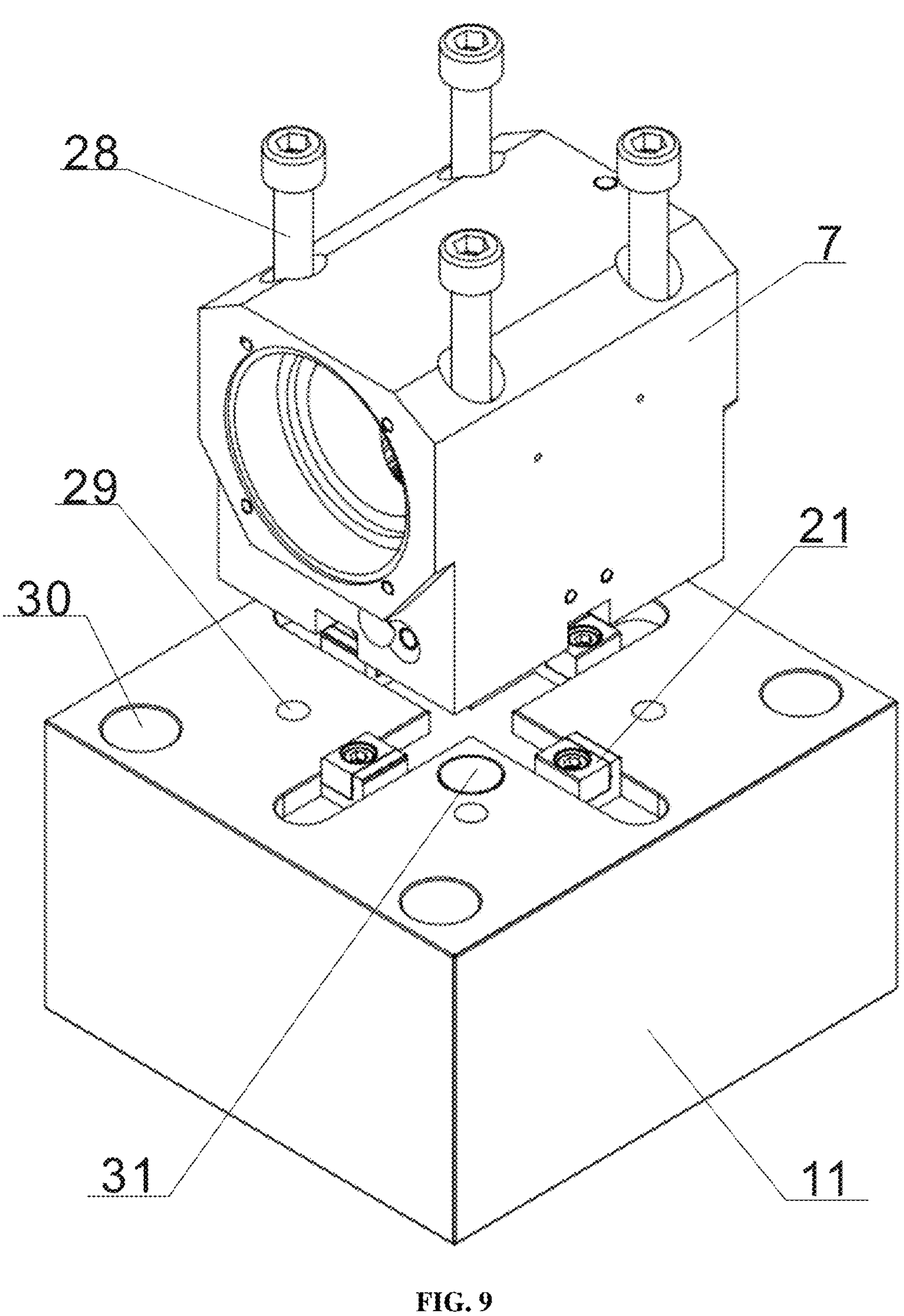
FIG. 9 shows a schematic assembly diagram of a third solution according to an embodiment of the present disclosure.

Referring to FIGS. 4-5, a positioning device for assembling a power tool holder housing includes the power tool holder housing 7, a positioning table 11 and elastic key blocks B 16. A lower cross keyway 8 is formed in the bottom surface of the power tool holder housing 7, and an upper cross keyway 9 is formed in the upper surface of the positioning table 11. The lower cross keyway 8 and the upper cross keyway 9 are disposed in up-down correspondence, and the elastic key blocks B 16 are respectively mounted in corresponding keyways in four directions. Each elastic key block B 16 includes an elastic key block body B 13, a contact plate 14 and an elastic plate 15. The elastic key block body B 13 is configured in a square shape and formed with an inverted "L"-shaped notch on one side surface. The elastic plate 15 and the contact plate 14 are sequentially disposed in the notch from the inside to the outside; the outer side surface of the contact plate 14 protrudes out of the outer side surface of the elastic key block body B 13 by 0.02 mm, the upper portion of the outer side surface of the contact plate 14 is configured as a bevel, and the outer side surface of the elastic key block body B 13 and the outer side surface of the contact plate 14 are disposed in beveled transition.

In an embodiment, a tapped hole B 12 is formed in the side, close to the screw holes, of the upper surface of each elastic key block body B 13, four bolt mounting holes disposed in up-down correspondence are respectively formed in the bottom of the upper cross keyway 9, and the bolt mounting holes are eccentric holes. The screw holes B 12 in the elastic key block bodies B 13 are corresponding to the bolt mounting holes in the bottom of the upper cross keyway 9; and the screw holes B 12 in the elastic key block bodies B 13 are fixedly connected to the bolt mounting holes in the bottom of the upper cross keyway 9 by means of bolts.

The use method of the positioning device including the power tool holder housing 7, the positioning table 11 and the elastic key blocks B16 is described with reference with FIGS. 4-5, and the use method of the positioning device includes specific operation steps as follow:

first, the positioning table 11 is fixed to a machining table top by means of long bolts in table mounting holes 30 at four corners of the positioning table 11;

second, the elastic plate 15 and the contact plate 14 are sequentially placed into the notch of each elastic key block body B 13; and the outer side surface of the elastic key block body B 13 and the outer side surface of the contact plate 14 are disposed in beveled transition;

third, four sets of mounted elastic key blocks B 16 are placed into the upper cross keyway 9 in the upper surface of the positioning table 11, the four sets of mounted elastic key blocks B 16 are respectively placed in the four directions of the upper cross keyway 9, and the bolts pass through the tapped holes B 12 of the elastic key block bodies B 13 and are fixedly connected to the bolt mounting holes in the bottom of the upper cross keyway 9;

fourth, the power tool holder housing 7 is pressed on the upper portions of the four sets of elastic key block bodies B 13, to allow the corresponding sides of the lower cross keyway 8 to compress the outer side surfaces of the contact plates 14, elastically deforming the elastic plates 15, compressing the contact plates 14 protruding out of the outer side surfaces of the elastic key block bodies B 13 back into the lower cross keyway 8 by a compressive amount of about 0.009 mm-0.02 mm, then allowing two sides of each elastic key block body B 13 to be completely attached to the keyway, and thus achieving clearance-free fit; and fifth, compression screws 28 at the four corners of the upper surface of the power tool holder housing 7 are tightened in four compression screw holes 29 in the upper surface of the positioning table 11, to play compression and securing roles during machining.

Referring to FIGS. 6-9, a positioning device for assembling a power tool holder housing includes the power tool holder housing 7, a positioning table 11 and elastic key blocks C 21. A lower cross keyway 8 is formed in the bottom surface of the power tool holder housing 7, and an upper cross keyway 9 is formed in the upper surface of the positioning table 11. The lower cross keyway 8 and the upper cross keyway 9 are disposed in up-down correspondence, and the elastic key blocks C 21 are respectively mounted in corresponding keyways in four directions. Each elastic key block C 21 includes an elastic key block body C19 and a press block 18, the elastic key block body C 19 is configured in the form of an "L" shaped step, the press block 18 is disposed on the stepped surface of the elastic key block body C 19; and the press block and the elastic key block body C 19 form a square structure; an elongated semicircular slot A 20 is formed in the length direction of the stepped inner side surface of the elastic key block body C 19; a clearance is formed between the press block 18 and the stepped inner side surface of the elastic key block body C 19 above the elongated semicircular slot A 20, and the stepped inner side surface of the elastic key block body C 19 below the elongated semicircular slot A20 is attached to the press block 18.

In an embodiment, a tapped hole C17 is formed in the upper surface of each press block 18, four bolt mounting holes disposed in up-down correspondence are respectively formed in the bottom of the upper cross keyway 9, and the bolt mounting holes are eccentric holes. The tapped holes C17 in the press blocks 18 are corresponding to the bolt mounting holes in the stepped surfaces of the elastic key block bodies C 19 and the bolt mounting holes in the bottom of the upper cross keyway 9; and the tapped holes C17 in the press blocks 18 are fixedly connected to the bolt mounting holes in the stepped surfaces of the elastic key block bodies C 19 and the bolt mounting holes in the bottom of the upper cross keyway 9 by means of bolts.

The use method of the positioning device including the power tool holder housing 7, the positioning table 11 and the elastic key blocks C 21 is described with reference to FIGS. 6-9. The use method of the positioning device includes specific operation steps as follow:

first, the positioning table 11 is fixed to a machining table top by means of long bolts in table mounting holes 30 at four corners of the positioning table 11;

second, the press blocks 18 is placed on the stepped surfaces of the elastic key block bodies C 19, four sets of mounted elastic key blocks C 21 are placed into the upper cross keyway 9 in the upper surface of the positioning table 11, the four sets of mounted elastic key blocks C 21 are respectively placed in the four directions of the upper cross keyway 9, and the bolts pass through the tapped holes C 17 of the press blocks 18, the bolt mounting holes in the stepped surfaces of the elastic key block bodies C 19 and the bolt mounting holes in the bottom of the upper cross keyway 9 to achieve a fixed connection, to allow the lower portion surfaces of the stepped inner side surfaces of the elastic key block bodies C 19 to be attached to the press blocks 18;

third, the power tool holder housing 7 is pressed on the upper portions of the four sets of elastic key blocks C 21, to allow the corresponding side walls of the lower cross keyway 8 to compress the elastic key block bodies C 19, deforming the elastic key block bodies C 19 toward the inner side surfaces of the press blocks 18, to allow two side surfaces of each elastic key block C 21 to be completely attached to two corresponding side inner walls of the lower cross keyway 8, and thus achieving clearance-free fit; and fourth, compression screws 28 at the four corners of the upper surface of the power tool holder housing 7 are tightened in four compression screw holes 29 of the upper surface of the positioning table 11, to play compression and securing roles during machining.

Figure 10:
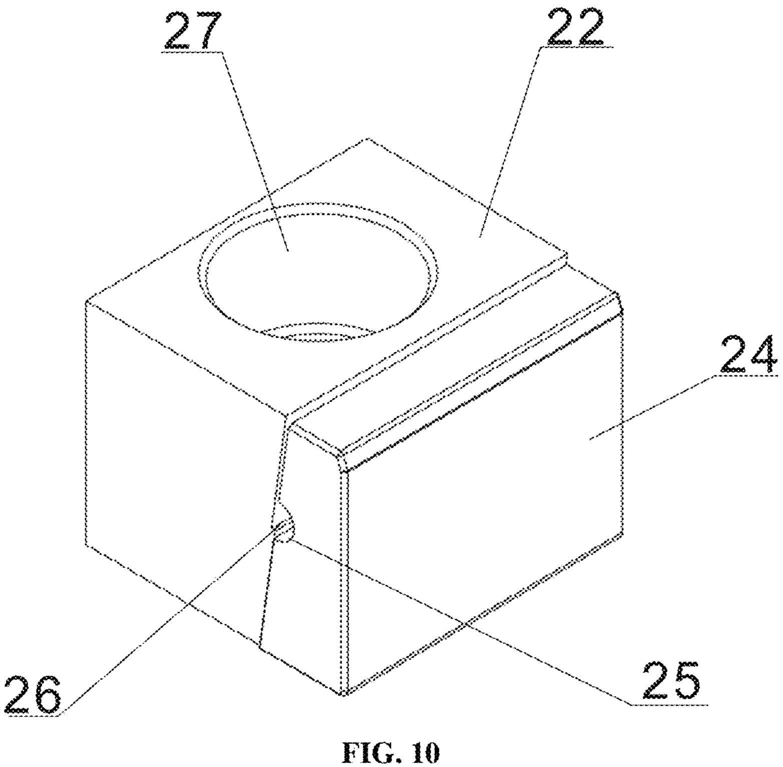
FIG. 10 shows a schematic structural diagram of an elastic key block D according to an embodiment of the present disclosure.
Figure 11:
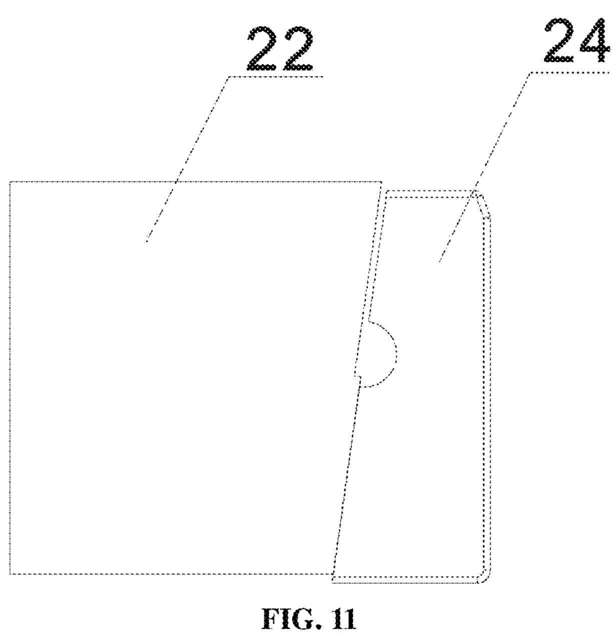
FIG. 11 shows a front view of an elastic key block D according to an embodiment of the present disclosure.
Figure 12:
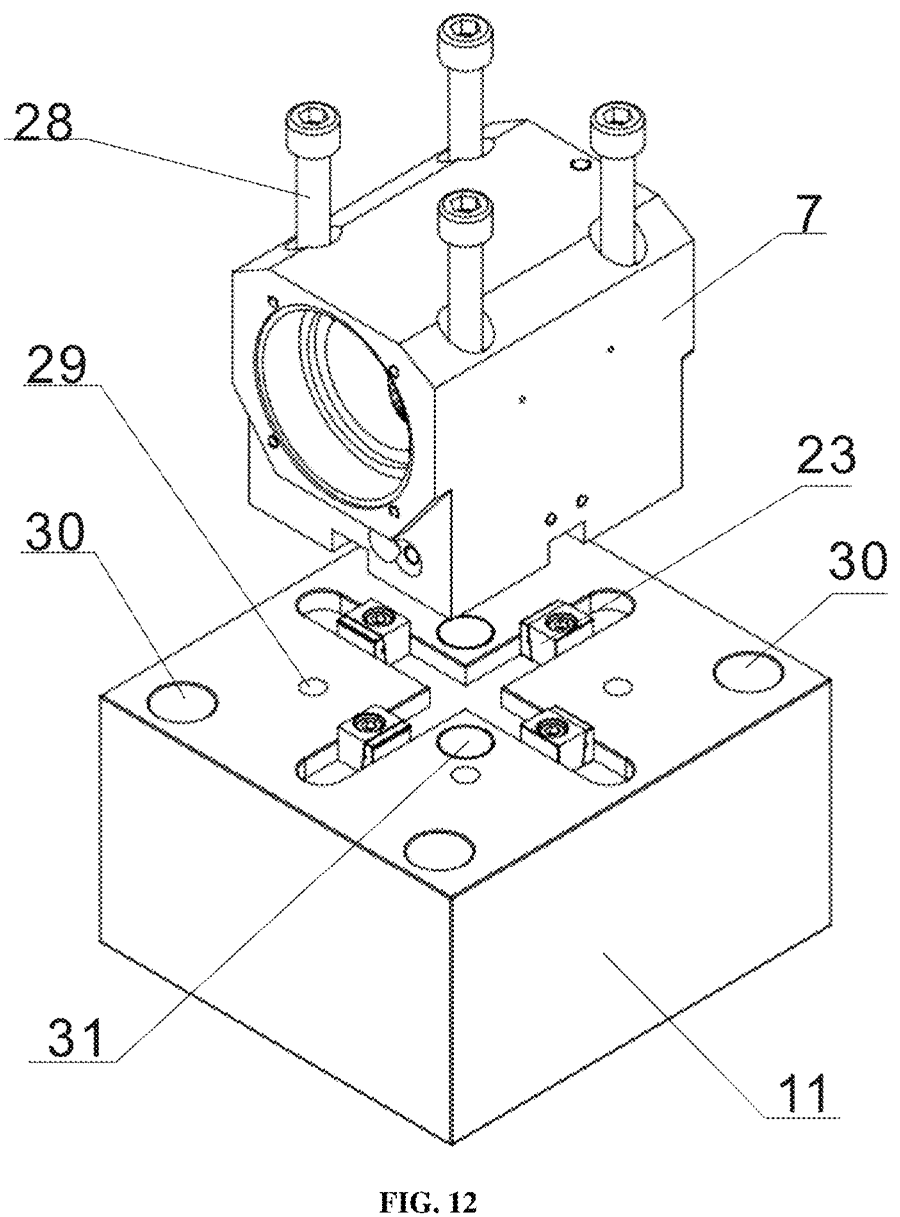
FIG. 12 shows a schematic assembly diagram of a fourth solution according to an embodiment of the present disclosure.

Referring to FIGS. 10-12, a positioning device for assembling a power tool holder housing includes the power tool holder housing 7, a positioning table 11 and elastic key blocks D 23. A lower cross keyway 8 is formed in the bottom surface of the power tool holder housing 7, and an upper cross keyway 9 is formed in the upper surface of the positioning table 11. The lower cross keyway 8 and the upper cross keyway 9 are disposed in up-down correspondence, and the elastic key blocks D 23 are respectively mounted in corresponding keyways in four directions. Each elastic key block D 23 includes an elastic key block body D 24 and a trapezoidal key block 22, the trapezoidal key block 22 is configured in the shape of a right-angle trapezoid having a larger upper side and a smaller lower side, and the middle of a bevel of the trapezoid key block 22 is provided with an elongated boss 26 in the length direction of the middle; the elastic key block body D 24 is configured in the shape of a right-angle trapezoid having a smaller upper side and a larger lower side, a bevel of the lower portion of the boss 26 is in contact with a bevel of the corresponding elastic key block body D 24, a clearance is formed between the bevel of the upper portion of the boss 26 and the bevel of the elastic key block body D 24, and an elongated semicircular slot B 25 is formed in the middle of the elastic key block body D 24 corresponding to the boss 26.

In an embodiment, a tapped hole D 27 is formed in each trapezoidal key block 22, four bolt mounting holes disposed in up-down correspondence are formed in the bottom of the upper cross keyway 9, the bolt mounting holes are eccentric holes, the tapped holes D 27 in the trapezoidal key blocks 22 are corresponding to the bolt mounting holes in the bottom of the upper cross keyway 9, and the tapped holes D 27 in the trapezoidal key blocks 22 are fixedly connected to the bolt mounting holes in the bottom of the upper cross keyway 9 by means of bolts.

The use method of the positioning device including the power tool holder housing 7, the positioning table 11 and the elastic key blocks D 23 is described with reference to FIGS. 10-12, and the use method of the positioning device includes specific operation steps as follow:

first, the positioning table 11 is fixed to a machining table top by means of long bolts in table mounting holes 30 at four corners of the positioning table 11;

second, the bevels of four sets of elastic key block bodies D 24 are corresponded to the bevels of the trapezoidal key blocks 22, the four sets of elastic key block bodies D 24 are placed in the upper cross keyway 9 in the upper surface of the positioning table 11, and the four sets of elastic key block bodies D 24 are respectively placed in the four directions of the upper cross keyway 9. In this case, the bottom surfaces of the trapezoidal key blocks 22 are higher than the bottom surfaces of the elastic key block bodies D 24, the bottom surfaces of the elastic key block bodies D 24 are located at the bottom of the upper cross keyway 9, but the bottom surfaces of the trapezoidal key blocks 22 are not in contact with the bottom of the upper cross keyway 9, and the top surfaces of the trapezoidal key blocks 22 protrudes out of the top surfaces of the elastic key block bodies D 24;

third, the bolts in the tapped holes D 27 are pressed down to pass through the tapped holes D 27 of the elastic trapezoidal key blocks 22, the bolts are tightened in the bolt mounting holes of the upper cross keyway 9; in this case, the trapezoidal key blocks 22 and the elastic key block bodies D 24 are compressed downward, and the trapezoidal key blocks 22 are descended during downward compression; the lower portions of the elastic key block bodies D 24 and the trapezoidal key blocks 22 are expanded tightly within the upper cross keyway 9, the lower cross keyway 8 of the power tool holder housing 7 is pressed on the upper portions of the elastic key block bodies D 24 and the trapezoidal key blocks 22; the elastic key block bodies D 24 are compressed by the corresponding side walls of the lower cross keyway 8, the elastic key block bodies D24 are deformed toward clearances between the bevels of the upper portions of the bosses 26 and the bevels of the elastic key block bodies D 24, to allow two side surfaces of each elastic key block D23 to be completely attached to two corresponding side inner walls of the lower cross keyway 8, and thus achieving clearance-free fit; and fourth, compression screws 28 at the four corners of the upper surface of the power tool holder housing 7 are tightened in four compression screw holes 29 of the upper surface of the positioning table 11, to play compression and securing roles during machining.

In the above-described four implementations, the positioning table 11 is symmetrically arranged with two pin holes 31, pins are provided in the pin holes 31, and a jacking mechanism is provided at the lower portion of the machining table top. The jacking mechanism is the prior art, and after tool holder machining is completed, it is required to remove the power tool holder housing; as long as the jacking mechanism acts, a jacking end of the jacking mechanism jacks upward, and the pins in the pin holes 31 can be pushed to move upward, thus pushing out the power tool holder housing.

The undescribed section of the present disclosure is the prior art.

The embodiments selected herein for the purposes of disclosing the present disclosure are currently considered to be suitable, but it should be understood that the present disclosure aims to include all variations and improvements of the embodiments falling within the scope of the concept and the present disclosure.

What is claimed is:

1. A positioning method of a positioning device for assembling a power tool holder housing, using the positioning device for assembling a power tool holder housing, the positioning device comprising the power tool holder housing, a positioning table and elastic key blocks A, wherein a lower cross keyway is formed in a bottom surface of the power tool holder housing, an upper cross keyway is formed in an upper surface of the positioning table; the lower cross keyway and the upper cross keyway are disposed in up-down correspondence; and the elastic key blocks A are respectively mounted in corresponding keyways of the upper cross keyway in four directions; each of the elastic key blocks A comprises an elastic key block body A, a cylindrical pin and elastic screws; an elongated circular notch is formed in an upper portion of a side surface of the elastic key block body A in a length direction of the elastic key block body A, and the elongated circular notch has a longitudinal section in a "C" shape; the cylindrical pin is disposed in the elongated circular notch, an opening of the elongated circular notch is located in the lower cross keyway, two screw holes are spaced apart on a surface opposite to the side surface in which the elongated circular notch is formed, elastic screws respectively penetrate into the screw holes, and the screw holes are disposed in communication with the elongated circular notch; a tapped hole A is formed in a side, close to the screw holes, of an upper surface of the elastic key block body A; four bolt mounting holes disposed in up-down correspondence are respectively formed in a bottom of the upper cross keyway, the bolt mounting holes are eccentric holes; the tapped holes A in elastic key block bodies A are corresponding to the bolt mounting holes in the bottom of the upper cross keyway, and are fixedly connected to the bolt mounting holes in the bottom of the upper cross keyway by means of bolts;

the positioning method comprises specific operation steps as follows:

a, fixing the positioning table to a machining table top by means of long bolts in table mounting holes at four corners of the positioning table;

b, screwing the elastic screws into the two screw holes, and abutting the elastic screws against the cylindrical pin in the elongated circular notch to allow a camber surface of the cylindrical pin to protrude out of the opening of the elongated circular notch by 0.08 mm-0.1 mm;

c, placing four sets of elastic key block bodies A mounted with the cylindrical pins into the upper cross keyway in the upper surface of the positioning table, respectively placing the four sets of elastic key block bodies A in the four directions of the upper cross keyway, and passing the bolts through the tapped holes A in the elastic key block bodies A and fixedly connecting the bolts to the bolt mounting holes in the bottom of the upper cross keyway;

d, pressing the power tool holder housing on upper portions of the four sets of elastic key block bodies A, to allow camber surface portions of the cylindrical pins protruding out of the openings to come into contact with the corresponding sides of the lower cross keyway, the lower cross keyway compressing the protruding camber surface portions back into the elastic key block bodies A by 0.089 mm-0.01 mm with a keyway tolerance of 0.011 mm-0 mm, thereby achieving clearance-free fit; and e, tightening compression screws at four corners of an upper surface of the power tool holder housing in four compression screw holes of the upper surface of the positioning table.

2. A positioning method of a positioning device for assembling a power tool holder housing, using the positioning device for assembling a power tool holder housing, the positioning device comprising the power tool holder housing, a positioning table and elastic key blocks D, wherein the positioning device comprises the power tool holder housing, the positioning table and the elastic key blocks D, a lower cross keyway is formed in a bottom surface of the power tool holder housing, an upper cross keyway is formed in an upper surface of the positioning table; the lower cross keyway and the upper cross keyway are disposed in up-down correspondence; and the elastic key blocks D are respectively mounted in corresponding keyways of the upper cross keyway in four directions; each of the elastic key blocks D comprises an elastic key block body D and a trapezoidal key block; the trapezoidal key block is configured in a shape of a right-angle trapezoid having a larger upper side and a smaller lower side; and a middle of a bevel of the trapezoid key block is provided with an elongated boss in a length direction of the middle of the bevel of the trapezoid key block; the trapezoid key block body D is configured in a shape of a right-angle trapezoid having a smaller upper side and a larger lower side; a bevel of a lower portion of the boss is in contact with a bevel of the elastic key block body D, a clearance is formed between the bevel of an upper portion of the boss and the bevel of the elastic key block body D; and an elongated semicircular slot B is formed in a middle of the elastic key block body D corresponding to the boss; a tapped hole D is formed in an upper surface of the trapezoidal key block; four bolt mounting holes disposed in up-down correspondence with the tapped holes D are formed in a bottom of the upper cross keyway, the bolt mounting holes are eccentric holes; the tapped holes D in the trapezoidal key blocks are corresponding to the bolt mounting holes in the bottom of the upper cross keyway, and the tapped holes D in the trapezoidal key blocks are fixedly connected to the bolt mounting holes in the bottom of the upper cross keyway by means of bolts;

the positioning method comprises specific operation steps as follows:

a, fixing the positioning table to a machining table top by means of long bolts in table mounting holes at four corners of the positioning table;

b, corresponding four sets of elastic key block bodies D to bevels of the trapezoidal key blocks, placing the four sets of elastic key block bodies D into the upper cross keyway in the upper surface of the positioning table, respectively placing the four sets of elastic key block bodies D in the four directions of the upper cross keyway; and bottom surfaces of the trapezoidal key blocks being higher than bottom surfaces of the elastic key block bodies D, the bottom surfaces of the elastic key block bodies D being located at the bottom of the upper cross keyway; the bottom surfaces of the trapezoidal key blocks being not in contact with the bottom of the upper cross keyway, and top surfaces of the trapezoidal key blocks protruding out of top surfaces of the elastic key block bodies D;

c, pressing down the bolts in the tapped holes D to pass through the tapped holes D of the elastic trapezoidal key blocks, tightening the bolts in the bolt mounting holes of the upper cross keyway; compressing the trapezoidal key blocks and the elastic key block bodies D downward, and descending the trapezoidal key blocks during downward compression; tightly expanding lower portions of the elastic key block bodies D and the trapezoidal key blocks in the upper cross keyway, pressing the lower cross keyway of the power tool holder housing on upper portions of the elastic key block bodies D and the trapezoidal key blocks; corresponding side walls of the lower cross keyway compressing the elastic key block bodies D, deforming the elastic key block bodies D toward clearances between the bevels of the upper portions of the bosses and the bevels of the elastic key block bodies D, to allow two side surfaces of each of the elastic key blocks D to be completely attached to two corresponding side inner walls of the lower cross keyway, and thereby achieving clearance-free fit; and d, tightening compression screws at four corners of an upper surface of the power tool holder housing in four compression screw holes of the upper surface of the positioning table.

* * * * *